(12) United States Patent
Saraswat et al.

(10) Patent No.: US 8,519,798 B2
(45) Date of Patent: Aug. 27, 2013

(54) PHASE-LOCKED LOOP BASED CHAOTIC SPREAD SPECTRUM GENERATOR

(75) Inventors: Ruchir Saraswat, Swindon (GB); Ulrich Bretthauer, Braunschweig (DE)

(73) Assignee: Intel Corporation, Santa Clara, CA (US)

( * ) Notice: Subject to any disclaimer, the term of this patent is extended or adjusted under 35 U.S.C. 154(b) by 581 days.

(21) Appl. No.: 12/770,239

(22) Filed: Apr. 29, 2010

(65) Prior Publication Data

US 2011/0134963 A1      Jun. 9, 2011

Related U.S. Application Data

(63) Continuation-in-part of application No. 12/631,281, filed on Dec. 4, 2009, now Pat. No. 8,421,544.

(51) Int. Cl.
*H03L 7/085* (2006.01)

(52) U.S. Cl.
USPC .................. 331/1 A; 331/78; 331/34; 331/16; 327/156; 327/159; 375/376

(58) Field of Classification Search
USPC ............... 331/16, 78, 34, 1 A; 327/156, 159; 375/376
See application file for complete search history.

(56) References Cited

U.S. PATENT DOCUMENTS

| 5,263,055 | A | | 11/1993 | Cahill |
| 5,506,545 | A | * | 4/1996 | Andrea ............................ 331/78 |
| 5,699,005 | A | | 12/1997 | Menkhoff et al. |
| 5,943,382 | A | * | 8/1999 | Li et al. .......................... 375/376 |
| 6,687,319 | B1 | * | 2/2004 | Perino et al. ................... 375/367 |
| 2009/0016413 | A1 | | 1/2009 | Shen et al. |

OTHER PUBLICATIONS

Non-Final Office Action mailed Jul. 24, 2012 for Japanese Patent Application No. 2010-233718.
De Michele, L. et al., "Chaos-Based High-EMC Spread-Spectrum Clock Generator", Proceedings of the 2005 European Conference on Circuit Theory and Design, Oct. 31, 2005, vol. 1, I/165-I/168.
Search and Examination Report for United Kingdom Patent Application No. GB1018348.1, Mailed Feb. 25, 2011, 3 pages.
Callegari, Sergio et al., "Spectral Properties of Chaos-Based FM Signals: Theory and Simulation Results", IEEE Transactions on Circuits and Systems—Fundamental Theory and Applications, vol. 50, No. 1, Jan. 2003, 13 pages.
Dellnitz, Michael et al., "On the isolated spectrum of the Perron-Frobenius operator", University of Paderborn, Dec. 10, 1999, 18 pages.
Pareschi, Fabio et al., "A 3 GHz Spread Spectrum Clock Generator for SATA Applications Using Chaotic PAM Modulation", Custom Integrated Circuits Conference, 2008. CICC 2008, IEEE Sep. 21-24, 2008, (Sep. 21, 2008), p. 451-454, 4 pages.
Final Office Action mailed Oct. 2, 2012 for U.S. Appl. No. 12/631,281.
Non-Final Office Action mailed May 8, 2012 for U.S. Appl. No. 12/631,281.

* cited by examiner

*Primary Examiner* — Arnold Kinkead
(74) *Attorney, Agent, or Firm* — Blakely, Sokoloff, Taylor & Zafman LLP

(57) ABSTRACT

Embodiments of the invention relate to apparatus and method for reducing electromagnetic interference (EMI) and radio frequency interference (RFI) in computer systems via a chaotic frequency modulation. In one embodiment, an apparatus comprises a first cell comprising a chaotic signal generator to generate a chaotic signal and a phase-locked loop (PLL) to generate a modulated output signal based at least on an unmodulated reference signal and the chaotic signal.

20 Claims, 7 Drawing Sheets

PHASE-LOCKED LOOP BASED CHAOTIC SPREAD SPECTRUM GENERATOR

CROSS-REFERENCE TO RELATED APPLICATIONS

This is a continuation-in-part of application Ser. No. 12/631,281, filed on Dec. 4, 2009, now U.S. Pat. No. 8,421,544 entitled "A Chaotic Wide Band Frequency Modulator For Spread Spectrum Applications for EMI Reduction," and issued as U.S. Pat. No. 8,421,544 on Apr. 16, 2013, and assigned to the corporate assignee of the present invention and incorporated herein by reference.

FIELD OF THE INVENTION

Embodiments of the invention relate generally to the field of noise reduction in a computer system. More particularly, embodiments of the invention relate to apparatus and method for reducing electromagnetic interference (EMI) and radio frequency interference (RFI) in computer systems via a chaotic wide band frequency modulation.

BACKGROUND OF THE INVENTION

As computing devices become more common, the electromagnetic interference (EMI) and radio frequency interference (RFI) caused by one computing device on the operation of another computing device reduces the performance of the other computing device. Such interference may be reduced by special noise reduction casing around the computer devices that deflect any external electromagnetic or radio frequency waves from interfering with the operation and performance of the computer devices. Special paints may also be applied on computing device casings to deflect undesirable electromagnetic or radio frequency signals. Such casings and special paints are expensive and thus not feasible as prices of computing devices reduce.

Noise reduction circuits in computing devices may replace the need for expensive casings and special paints. Traditionally, periodic modulation profiles such as sinusoidal, triangular, and Lexmark profiles have been used to reduce power spectrum peaks generated by processors of a computing device. A lower power peak of the spectrum results in lower EMI interference. Such techniques, however, increase bandwidth of the power spectrum. An increase in bandwidth of the power spectrum may result in interference with neighboring frequency bands causing RFI.

With the inclusion of more and more radios on chip within the free frequency band, multi-radio environment designers face two challenges.

First, the frequency band is becoming more and more clogged with different devices on chip and the surrounding environment. This leads to different devices interacting with each other and causing interference. Such interference can be reduced by shifting the frequency of operation to be away from the interfering channels as shown by FIG. 1. FIG. 1 shows a frequency vs. power plot to illustrate the concept of frequency spreading. To reduce RFI, the operating frequency is shifted as shown by shifting power spectrum 101 to 102. While RFI may be reduced by frequency shifting, the high power peaks of 101 and 102 continue to pose EMI issues.

Second, with increase in frequencies due to abundance of computing devices, reducing EMI to levels specified by regulatory bodies such as the Federal Communications Commission (FCC) is becoming challenging. Traditionally, such challenge is met by spread spectrum techniques that use periodic clock frequency for modulating the power frequency spectrum of a computing device.

The spread spectrum technique increases the bandwidth of the frequency spectrum to decrease the peak power in the spectrum. In FIG. 1, applying spread spectrum technique on the frequency spectrum 105 of a device under test results in a flatter frequency spectrum 104. If a further reduction in peak power is required, a further spread would result in 103. However, reducing the power of 104 to tackle EMI may result in RFI (as shown by 106) due to higher bandwidth of 103. The loss in power to avoid EMI (due to higher power peak) is shown by 105. The higher bandwidth of 103 is caused by enabling a higher spread spectrum technique compared to that applied for 104.

BRIEF DESCRIPTION OF THE DRAWINGS

Embodiments of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE INVENTION

Figure 1:
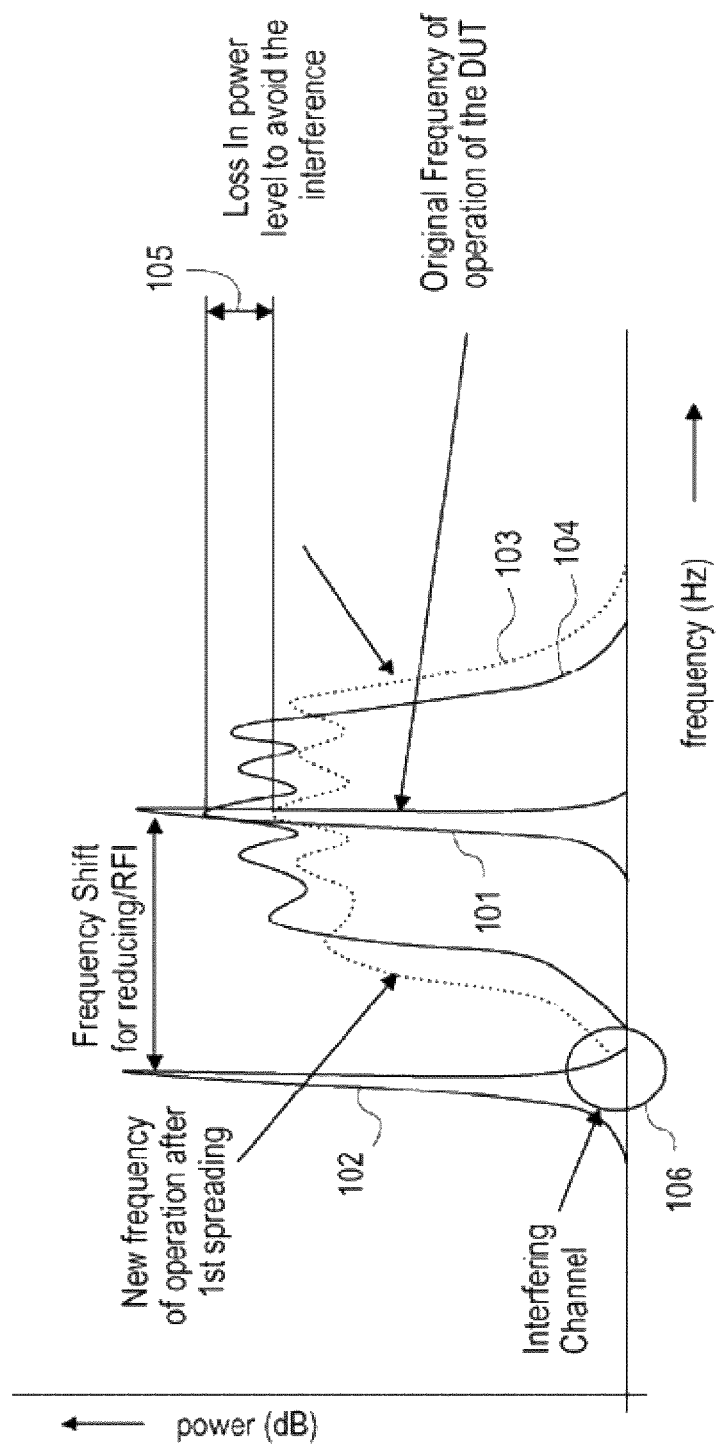
FIG. 1 shows the problem of spread spectrum technique for reducing EMI that may cause RFI.

Embodiments of the invention relate to apparatus and method for reducing electromagnetic interference (EMI) and radio frequency interference (RFI) in computer systems via a chaotic frequency modulation. In one embodiment, an apparatus comprises a first cell comprising a chaotic signal generator to generate a chaotic signal and a phase-locked loop (PLL) to generate a modulated output signal based at least on an un-modulated reference signal and the chaotic signal.

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of present invention also relate to apparatuses for performing the operations herein. Some apparatuses may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, embodiments of the present invention are not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

The method and apparatus described herein are for generating a modulated signal. Specifically, generating the modulated signal based at least in part on a chaotic signal is primarily discussed in reference to a circuit. However, the methods and apparatus for generating the modulated signal are not so limited, as they may be implemented on or in association with any integrated circuit device or system, such as cell phones, personal digital assistants, embedded controllers, mobile platforms, desktop platforms, and server platforms, as well as in conjunction with other resources.

Overview

Embodiments of the invention relate to apparatus and method for reducing electromagnetic interference (EMI) and radio frequency interference (RFI) in computer systems via a chaotic frequency modulation. In one embodiment, an apparatus comprises a first cell comprising a chaotic signal generator to generate a chaotic signal and a phase-locked loop (PLL) to generate a modulated output signal based at least on an un-modulated reference signal and the chaotic signal.

Figure 2:
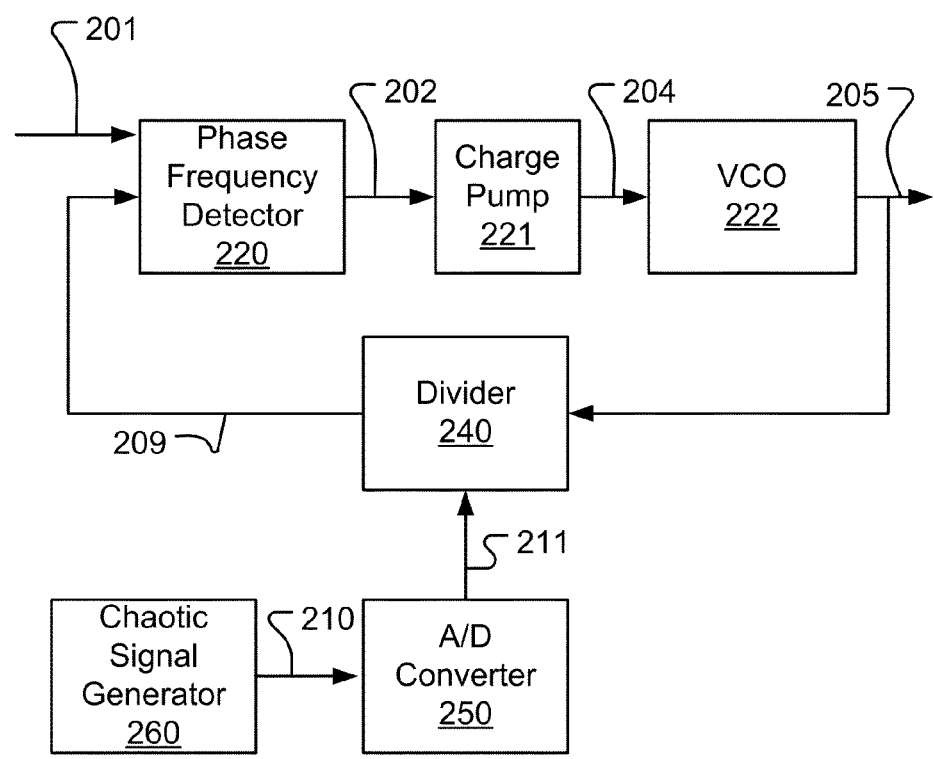
FIG. 2 is a block diagram a feedback path based frequency modulator in accordance with one embodiment of the invention.

FIG. 2 is a block diagram a feedback path based frequency modulator in accordance with one embodiment of the invention. Many related components such as buses with peripherals have not been shown to avoid obscuring the embodiment of the invention. Referring to FIG. 2, the frequency modulator comprises phase frequency detector 220, charge pump 221, voltage controlled oscillator 222, divider 240, chaotic signal generator 260, and A/D converter 250. In one embodiment, a fractional N phase-locked loop includes phase frequency detector 220, charge pump 221, voltage controlled oscillator 222, and divider 240. In one embodiment, output 205 is a modulated output signal based on an un-modulated reference signal 201 and chaotic signal generated by chaotic signal generator 260.

In one embodiment, phase frequency detector 220 receives two signals including reference signal 201 and feedback signal 209. In one embodiment, reference signal 201 and feedback signal 209 are periodical signals. In one embodiment, charge pump 221 receives phase difference 202 from phase frequency detector 220. In one embodiment, voltage controlled oscillator is coupled to charge pump 221 via control voltage 204. Output 205 is coupled to divider 240. Feedback signal 209 is an output of divider 240 which is one of the inputs coupled to phase frequency detector 220.

In one embodiment, a phase difference between reference signal 201 and feedback signal 209 is translated into two signals UP and DN. The two signals control switches to steer current into or out of a capacitor, causing the voltage across the capacitor to increase or decrease. In each cycle, the time during which the switch is turned on is proportional to the phase difference. The charge delivered is dependent on the phase difference. The voltage on the capacitor is used to tune voltage controlled oscillator 222 to generate a signal at output 205.

In one embodiment, the divider value of divider 240 is set to generate an output frequency at output 205 in conjunction with the output of A/D convertor 250. In one embodiment, a controller (not shown) determines an intended output frequency based on the frequency of reference signal 201 in conjunction with digital value 211. The divider value 211 is set accordingly to generate the intended output frequency at output 205.

In one embodiment, for example, the divider value is set to either 100 or 99. Reference signal 201 (10 MHz) can be used to generate output 205 with a frequency between 1 GHz (10 MHz multiplied by 100) and 9.9 GHz (10 MHz×99). In one embodiment, the divider value is set to either N or N+1 in a proportion to achieve an average divider value based on the intended output frequency at output 205. N is a non-zero integer. In one embodiment, by changing the divider value between the values N and N+1, the average divider value becomes a fraction N+K/F. For example, if output 205 is divided by (N+1) for K times and divided by N for (F−K) times, the average divider value is N+K/F.

In one embodiment, chaotic signal generator 260 generates chaotic signal 210 based on a chaotic transfer map, wherein the chaotic transfer map includes one of a tent transfer map and a Bernoulli shift map. Chaotic Signal generator 260 will be described in further detail below with references to FIGS. 4A-4B.

In one embodiment, chaotic signal 210 is deterministic (pseudo-random). In one embodiment, a chaotic signal appears disordered and random but is deterministic in nature (e.g., a deterministic noise). A chaotic signal is sensitive to the initial condition such that a small variation in the initial condition may lead to a large variation in the behavior of the system. In one embodiment, A/D converter 205 converts chaotic signal 210 to corresponding digital value 211 (e.g., a bit stream). In one embodiment, the frequency profile of output 205 is chaotic as a result of chaotic signal 210.

Figure 3:
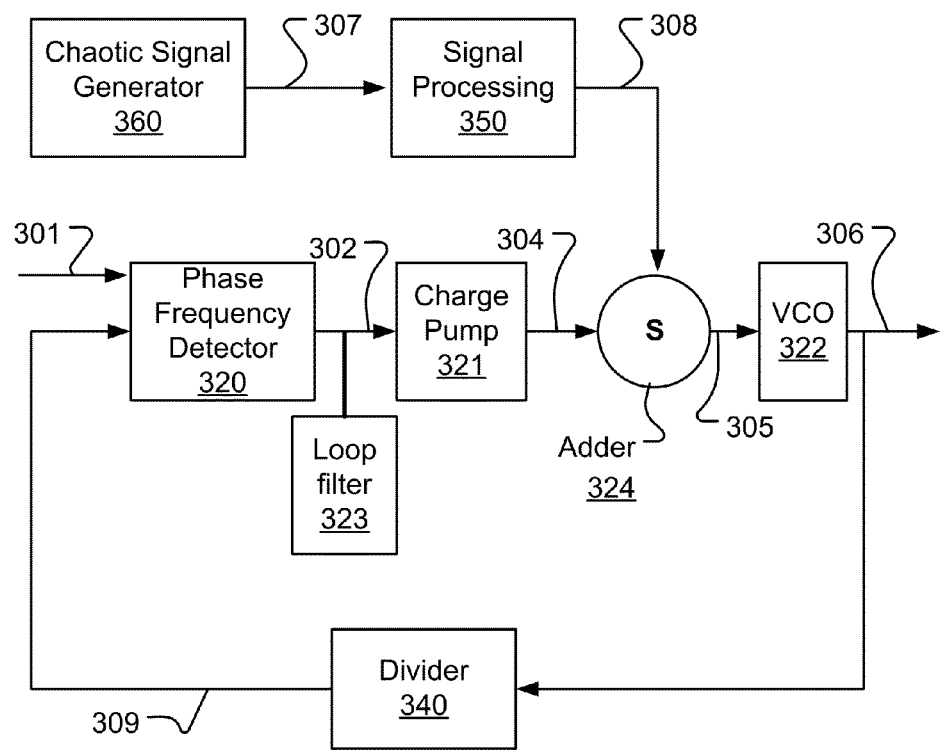
FIG. 3 is a block diagram a forward path based frequency modulator in accordance with one embodiment of the invention.

FIG. 3 is a block diagram a forward path based frequency modulator in accordance with one embodiment of the invention. Many related components such as buses with peripherals have not been shown to avoid obscuring the embodiment of the invention. Referring to FIG. 3, the frequency modulator comprises phase frequency detector 320, charge pump 321, voltage controlled oscillator 322, loop filter 323, divider 340, chaotic signal generator 360, signal processing unit 350, and adder 324. In one embodiment, a phase-locked loop includes phase frequency detector 320, charge pump 321, voltage controlled oscillator 322, and divider 340. In one embodiment, output 306 is a modulated output signal based on an unmodulated reference signal 301 and chaotic signal generated by chaotic signal generator 360.

In one embodiment, chaotic signal generator 360 generates chaotic signal 307 based on a chaotic transfer map, wherein the chaotic transfer map includes one of a tent transfer map, a Bernoulli shift map, Bakers map, and Logistic map. Chaotic Signal generator 360 will be described in further detail below with references to FIGS. 4A-4B.

In one embodiment, chaotic signal 307 is deterministic. In one embodiment, a chaotic signal appears disordered and random but is deterministic in nature (e.g., a deterministic noise). A chaotic signal is sensitive to the initial condition such that a small variation in the initial condition may lead to a large variation in the behavior of the system.

In one embodiment, signal processing unit 350 coupled to receive chaotic signal 307 generated by chaotic signal generator 360. In one embodiment, output of the PLL (output 306) is dependent on the input signal to the VCO (voltage controlled oscillator), a variation in the control signal leads to the variation of the output voltage. In one embodiment, signal processing unit 350 regulates/conditions chaotic signal 307 to meet required specifications and generates chaotic signal 308.

In one embodiment, phase frequency detector 320 receives two signals including reference signal 301 and feedback signal 309. In one embodiment, reference signal 301 and feedback signal 309 are periodical signals. Phase frequency detector 320 compares reference signal 301 and feedback signal 309 and generates phase difference 302 which is proportional to the phase difference between reference signal 301 and feedback signal 309. In one embodiment, phase frequency detector 320 generates UP and down signals, which are filtered by loop filter 323, in accordance with the phase difference.

In one embodiment, charge pump 321 receives phase difference 302 from phase frequency detector 320. The output from charge pump 321 is control voltage 304. In one embodiment, adder 324 adds chaotic signal 308 (after conditioning by signal processing 360) to control voltage 304. It will be appreciated by those skilled in the art that a current controlled signal may be used such that the addition is performed with current additions.

In one embodiment, voltage controlled oscillator 322 is coupled to adder 324 to receive summed output 305. The frequency of output 306 is proportional to the summed output 305 (a control voltage). Voltage controlled oscillator 322 generates a modulated output signal in response to summed output 305 which is based at least on reference signal 201 and chaotic signal 307. In one embodiment, output 306 is coupled to divider 340. Feedback signal 309 is an output of divider 340.

Chaotic Signal Generator

Figure 4A:
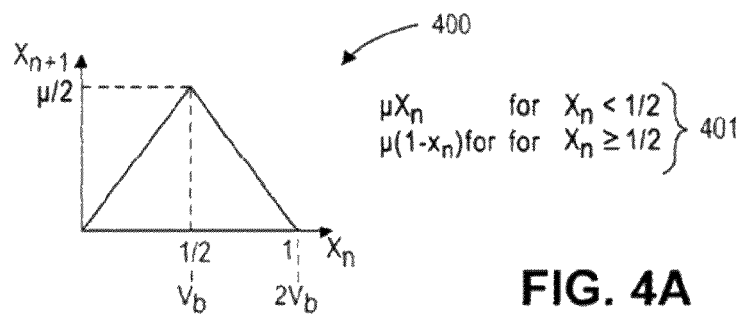
FIG. 4A shows a chaotic transfer map according to one embodiment of the invention.

FIG. 4A shows a chaotic transfer map according to one embodiment of the invention. One advantage of a tent map is that the transfer function has only two quadrants and therefore makes the implementation simple. Tent map 400 is described by a typical tent map equation 401. In one embodiment, tent map 400 is implemented with $\mu=2$. In other embodiments, other values of $\mu$ may be used without changing the principal of operation of a chaotic noise generator. Referring back to FIG. 4A, the x-axis is $X_n$ voltage while the y-axis is $X_{(n+1)}$ voltage. In one embodiment, the bias voltage $V_b$ (discussed with reference to FIG. 4B) is set to the halfway point of the triangular map signal. The implementation of the multiplying circuits, discussed in FIG. 4B, depends on what the bias voltage $V_b$ is set relative to $X_n$.

Figure 4B:
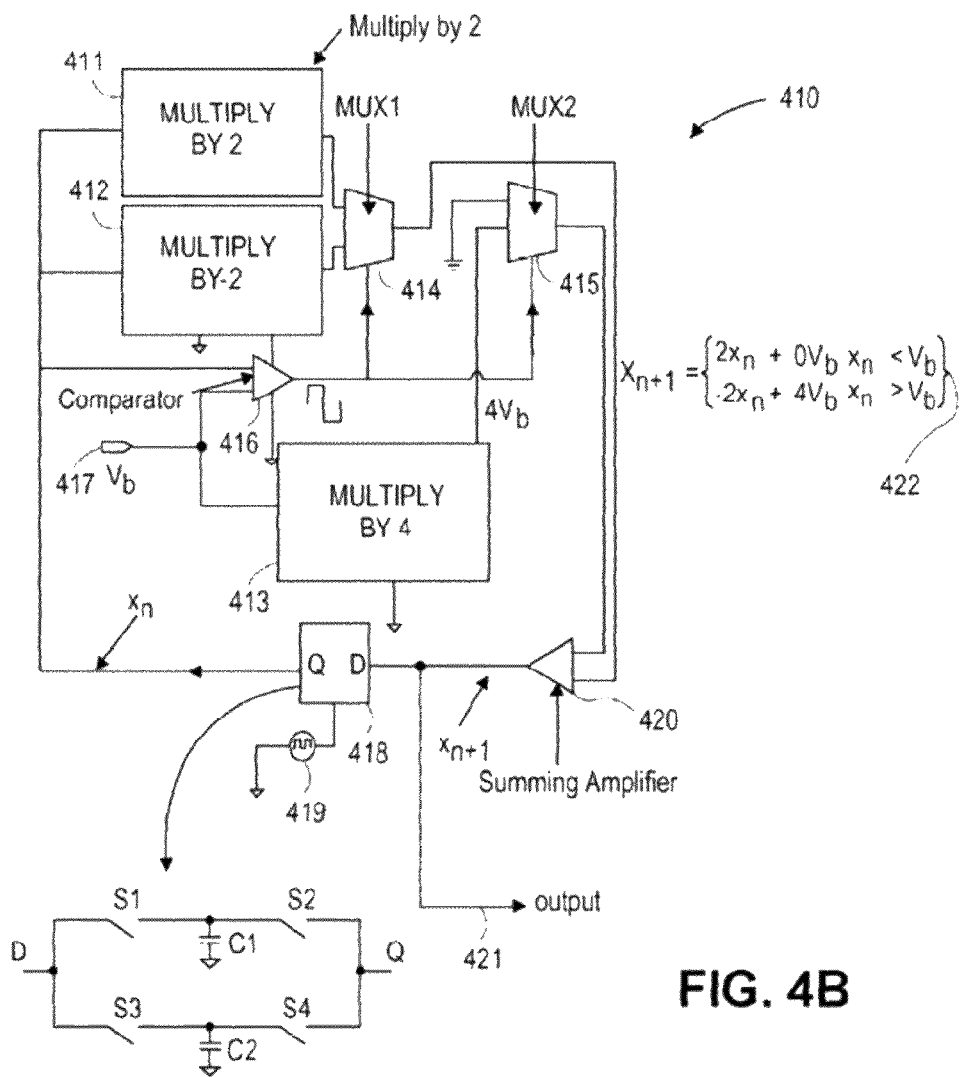
FIG. 4B shows an implementation of a chaotic noise generator according to one embodiment of the invention.

FIG. 4B shows an implementation of a chaotic noise generator according to one embodiment of the invention. The implementation discussed here uses tent map 400 (FIG. 4A) as a chaotic transfer map. In one embodiment, multipliers 411, 412, and 413 are analog multipliers. These multipliers, in one embodiment, are implemented as OP-AMP (operational amplifiers) based circuits. Resistors (not shown) in the multipliers determine the multiplying factors of multipliers 411, 412, and 413. In one embodiment, the multiplying factors of the multipliers are based on tent map equation 422. Therefore, multiplier 411 is a multiply by 2, multiplier 412 is a multiply by −2, and multiplier 413 is a multiply by 4, according to one embodiment of the invention.

In one embodiment, multiplier 411 multiplies a previous random noise signal $X_n$ by 2 to generate $2X_n$, multiplier 412 multiplies the previous random noise signal $X_n$ by −2 to generate $-2X_n$, and multiplier 413 multiplies the bias voltage $V_b$ 417 by 4 to generate $4V_b$.

In one embodiment, multiplexer 414 is operable to select either $2X_n$ or $-2X_n$ signals while multiplexer 415 is operable to either pass a ground signal (a zero) or $4V_b$ to summing amplifier 420, according to one embodiment of the invention. In one embodiment, depending on the voltage of the signal $X_n$, comparator 416 selects the appropriate control signals of multiplexers 411 and 412. The output of summing amplifier 420 is $X_{(n+1)}$ which is the output of tent map equation 422 (i.e., chaotic signal 421).

The output 421 of summing amplifier 420 is sampled by analog flip-flop 418. The sampling frequency of analog flip-flop 418 is controlled by clock signal 419. In one embodiment, analog flip-flop 418 is implemented with switches S1-S4 and capacitors C1-C2. In one embodiment, these switches are implemented as transistors. The switches operate out of phase with one another to connect the input node with one of the capacitors while the other capacitor samples the new value. In one embodiment, the output Q of analog flip-flop 418 is connected with a high impedance terminal to prevent the output capacitor from discharging. In one embodiment, the input D of analog flip-flop 418 is connected with a low impedance terminal to allow the input capacitor to be charged. In one embodiment, analog flip-flop 418 is operable to sample chaotic signal 421 at a programmable sampling frequency. The sampling frequency, in one embodiment, may be programmed by hardware, software, or both.

In one embodiment, bias voltage $V_b$ 417 is generated on-chip or off-chip. In one embodiment, bias voltage $V_b$ 417 is generated by a band-gap circuit (not shown). The value of $V_b$, 417, in one embodiment, is 105 mV. Bias voltage $V_b$ 417 is also used to program the spread of the frequency spectrum. This programming, in one embodiment, is implemented by software, hardware, or both. Changing bias voltage $V_b$ 417 changes the noise voltage level $X_n$ which in turn changes the output frequency (spread of the frequency spectrum) of the modulated output clock.

In one embodiment, for example, the initial condition of voltage X(n) (also referred as $X_n$) as shown in FIG. 4B when set to 50 mV will generate a completely different noise profile when compared to an initial condition of voltage X(n) set to 55 mV. In this example, a 5 mV change in the initial condition results in completely different noise profiles. In another embodiment, $V_b$ 417=200 mV and g=2.

In one embodiment, for every initial condition a known, but different, noise profile is generated by the chaotic signal generator. Consecutive samples of the chaotic signal will have a non-zero correlation between its consecutive samples. As mentioned above, a pure noise signal has a close to zero correlation between its consecutive samples.

Figure 5A:
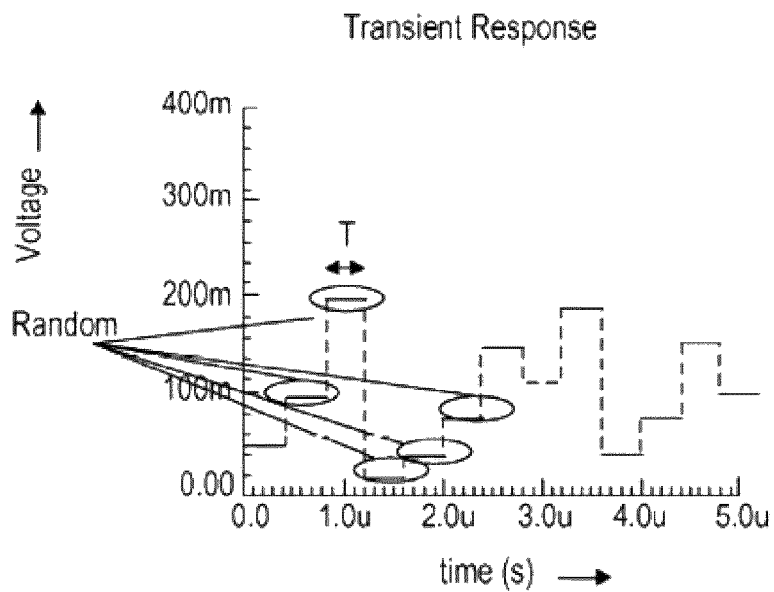
FIG. 5A shows the output of a chaotic noise generator that implements a tent map as the chaotic transfer map function, according to one embodiment of the invention.

FIG. 5A shows the output of a chaotic noise generator (e.g., chaotic signal generator of FIG. 4B) that implements a tent map as the chaotic transfer map function, according to one embodiment of the invention. The plot shows that chaotic signal levels are random over time because they do not follow any particular pattern (i.e., approximate to zero correlation between noise samples).

Figure 5B:
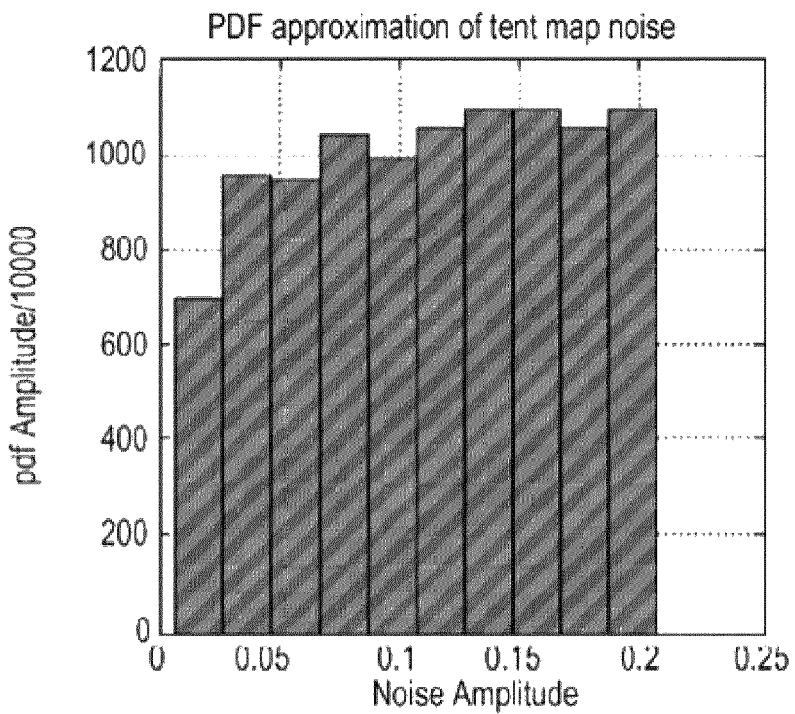
FIG. 5B shows the probability density function (PDF) of the tent map noise via a chaotic noise generator, according to one embodiment of the invention.

FIG. 5B shows the probability density function (PDF) of the tent map noise via the chaotic noise generator of FIG. 4B, according to one embodiment of the invention. After initial settling time of the circuits of a chaotic noise generator (e.g., chaotic signal generator with reference of FIG. 4B), the PDF is quite uniform and is comparable to white noise.

Figure 6:
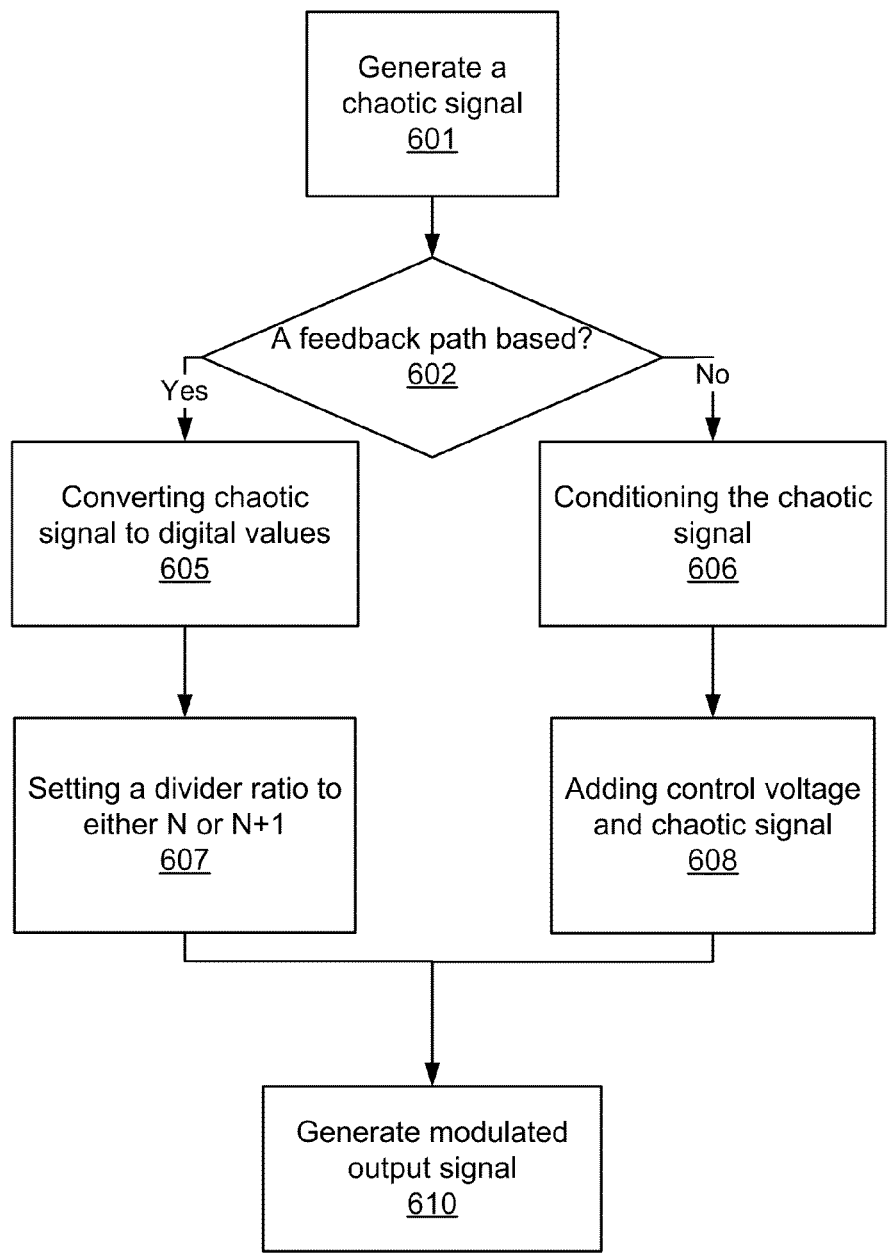
FIG. 6 is a flow diagram of one embodiment of a process to generate a modulated output in accordance with one embodiment of the invention.

FIG. 6 is a flow diagram of one embodiment of a process to generate a modulated output in accordance with one embodiment of the invention. The process is performed by processing logic that may comprise hardware (circuitry, dedicated logic, etc.), software (such as one that is run on a general purpose computer system or a dedicated machine), or a combination of both. In one embodiment, the process is performed in conjunction with a frequency modulator (e.g., a frequency modulator with respect to FIG. 2 or FIG. 3).

Referring to FIG. 6, in one embodiment, processing logic begins by generating a chaotic signal based on a chaotic transfer map function (process block 601). In one embodiment, processing logic is operable to perform the frequency modulation, based on a chaotic signal, in conjunction with a feedback path based implementation, a forward path based implementation, or both. Processing logic determines whether or not it is a feedback path based solution (process block 602).

In one embodiment, processing logic converts the chaotic signal to corresponding digital value (process block 605). Processing logic sets a divider value (or a divider ratio) of a phase-locked loop, in conjunction with the digital value, to generate a modulated output frequency. In one embodiment, processing logic determines a desired output frequency based on the frequency of a reference signal in conjunction with the digital value (converted from the chaotic signal). Processing logic sets the divider value of the phase-locked loop to generate the desired output frequency.

In one embodiment, the divider value is set to either N or N+1 in a proportion to achieve an average divider value (process block 607). Processing logic is operable to generate a modulated signal based at least on a reference signal and the chaotic signal (process block 610).

In one embodiment, processing logic performs conditioning on the chaotic signal (process block 606). In one embodiment, processing logic adds the chaotic signal to an output from a charge pump (process block 608). The voltage level of the charge pump is associated with a phase difference between a reference signal and a feedback signal. In one embodiment, processing logic is operable to cause generation of a modulated signal based at least on the reference signal and the chaotic signal (process block 610).

In one embodiment, processing logic generates a phase difference (phase error) signal based on a reference signal and a feedback signal. Processing logic sets a switch for duration proportional to the phase difference. Processing logic controls the voltage level of a charge pump by setting the switch. Processing logic tunes a voltage controlled oscillator to generate a modulated output signal.

Figure 7:
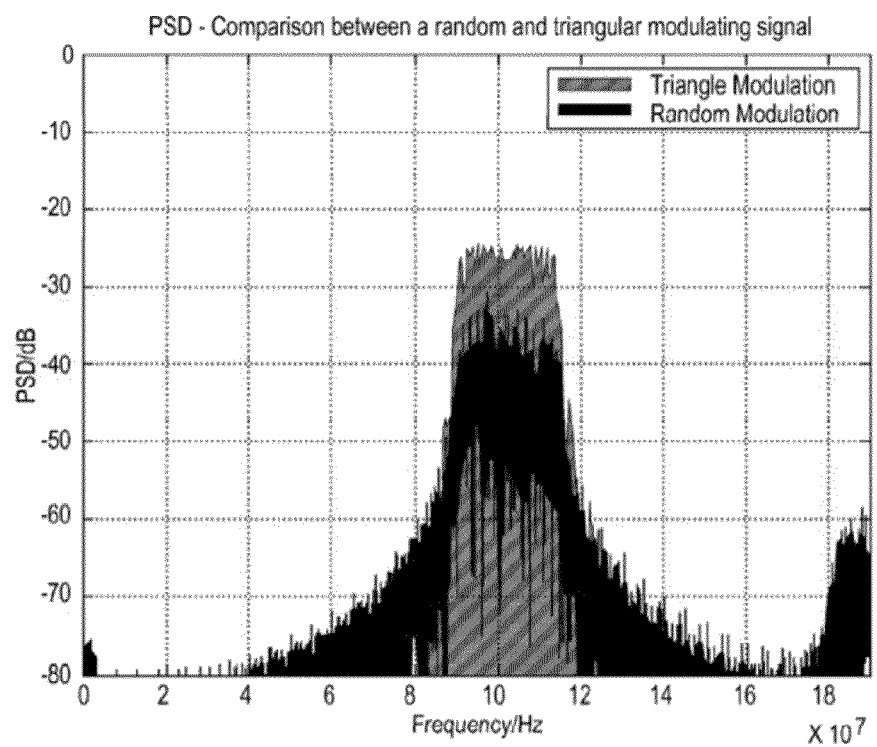
FIG. 7 shows the benefit of chaotic noise based modulation over periodic triangular signal based modulation, according to one embodiment of the invention.

FIG. 7 shows the benefit of a chaotic signal based modulation over a periodic triangular signal based modulation, according to one embodiment of the invention. The plot of FIG. 7 shows the power spectral density (PSD) of a periodically (triangular) modulated clock signal and the PSD of a chaotic modulated clock signal. The shaded gray spectrum represents the spectrum from modulating the clock signal via a periodic triangle signal, while the black spectrum represents the spectrum from modulating the clock signal via the chaotic signal, according to the embodiments described herein. The black colored spectrum has a lower power peak than the shaded gray spectrum, by 12 dB in this example. This means that chaotic noise based modulation lowers the EMI noise by 12 dB over the triangular based modulation. At the same time, the bandwidth of both the shaded gray spectrum and the black spectrum remains the same. This means that EMI can be reduced using the black spectrum by trading off power peak with bandwidth.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chipset components, programmable logic arrays (PLA), memory chips, network chips, or the like. Moreover, it should be appreciated that exemplary sizes/models/values/ranges may have been given, although embodiments of the present invention are not limited to the same. As manufacturing techniques (e.g., photolithography) mature over time, it is expected that devices of smaller size could be manufactured.

Whereas many alterations and modifications of the embodiment of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. An apparatus comprising:
   a chaotic signal generator to generate a chaotic signal;
   a signal processing unit coupled to the chaotic signal generator;
   a phase-locked loop (PLL) to generate a modulated output signal based at least on an un-modulated reference signal and the chaotic signal, and
   an A/D converter coupled to the PLL and the chaotic signal generator.

2. The apparatus of claim 1, wherein the chaotic signal is deterministic.

3. The apparatus of claim 1, wherein a divider value of the PLL is set based on an output of the A/D converter based at least in part on the chaotic signal.

4. The apparatus of claim 3, wherein the divider value is set to either N or N+1 in a proportion to achieve an average divider value associated with a frequency of the modulated output signal, wherein N is a non-zero integer.

5. The apparatus of claim 1, further comprising:
   an adder, coupled to add a first output from the signal processing unit and a second output from a charge pump, to generate a summed output; and
   a voltage controlled oscillator, coupled with the adder, to generate the modulated output signal.

6. The apparatus of claim 1, wherein the chaotic signal generator is operable to generate a chaotic signal based on a chaotic transfer map, and wherein the chaotic transfer map includes one of a tent transfer map and a Bernoulli shift map.

7. The apparatus of claim 1, wherein the chaotic signal generator comprises:
   a first positive multiplier;
   a negative multiplier;
   a first multiplexer coupled with the positive multiplier and the negative multiplier;
   a second multiplexer coupled with a second positive multiplier to multiply a bias voltage; and
   a summing amplifier coupled with the first multiplexer and the second multiplexer, to generate the chaotic signal.

8. The apparatus of claim 7, wherein the chaotic signal generator further comprises:
   a flip-flop operable to sample the chaotic signal; and
   a comparator, coupled with the flip-flop, to generate a control signal for the first multiplexer and the second multiplexer.

9. The apparatus of claim 8, wherein the flip-flop is operable to sample the chaotic signal at a programmable frequency.

10. The apparatus of claim 8, wherein the bias voltage is programmable to adjust the frequency spread of the modulated output signal.

11. A method comprising:
    generating a chaotic signal based on a chaotic transfer map function;
    generating a control voltage from an un-modulated reference signal based at least in part on the chaotic signal, wherein generating the control voltage comprises conditioning the chaotic signal;
    converting the chaotic signal to a corresponding digital value; and
    generating a modulated output signal based on the control voltage.

12. The method of claim 11, further comprising:
    determining a frequency of the modulated output signal based at least on a frequency of the un-modulated reference signal and the digital value; and
    setting a divider value to generate the modulated output signal.

13. The method of claim 11, wherein the generating the control voltage comprises:
    adding the chaotic signal to an output from a charge pump.

14. The apparatus of claim 11, wherein the generating the chaotic signal comprises:
    positively multiplying a previous chaotic signal by two;
    negatively multiplying the previous chaotic signal by two;
    positively multiplying a bias voltage by four;
    comparing the previous chaotic signal with the bias voltage;
    first multiplexing the previous chaotic signal, which is multiplied positively by two, and the previous chaotic signal, which is multiplied negatively by two;
    second multiplexing the bias voltage, which is positively multiplied by four, and a ground signal; and
    summing outputs from the first multiplexing and the second multiplexing to generate the chaotic signal.

15. An apparatus comprising:
    means for generating a chaotic signal based on a chaotic transfer map function;
    means for generating a control voltage from an un-modulated reference signal based at least in part on the chaotic signal, wherein the means for generating the control voltage comprises means for conditioning the chaotic signal;
    means for converting the chaotic signal to a corresponding digital value; and
    means for generating a modulated output signal based at least on the control voltage.

16. The apparatus of claim 15, further comprising:
    means for determining a frequency of the modulated output signal based at least on a frequency of the reference signal and the digital value; and
    means for setting a divider value to generate the modulated output signal.

17. The apparatus of claim 16, wherein the divider value is set to either N or N+1 in a proportion to achieve an average divider value associated with the frequency of the modulated output signal, wherein N is a non-zero integer.

18. The apparatus of claim 15, wherein the chaotic signal is deterministic.

19. The apparatus of claim 15, wherein the means for generating the control voltage comprises:
    means for adding the chaotic signal to an output from a charge pump.

20. The apparatus of claim 15, wherein the means for generating the chaotic signal comprises:
    means for positively multiplying a previous chaotic signal by two;
    means for negatively multiplying the previous chaotic signal by two;
    means for positively multiplying a bias voltage by four;
    means for comparing the previous chaotic signal with the bias voltage;
    means for first multiplexing the previous chaotic signal, which is multiplied positively by two, and the previous chaotic signal, which is multiplied negatively by two;
    means for second multiplexing the bias voltage, which is positively multiplied by four, and a ground signal; and
    means for summing outputs from the first multiplexing and the second multiplexing to generate the chaotic signal.

* * * * *